United States Patent
Wei et al.

(10) Patent No.: US 11,651,507 B2
(45) Date of Patent: May 16, 2023

(54) CONTENT-ADAPTIVE BINOCULAR MATCHING METHOD AND APPARATUS

(71) Applicant: INSPUR SUZHOU INTELLIGENT TECHNOLOGY CO., LTD., Jiangsu (CN)

(72) Inventors: Hui Wei, Jiangsu (CN); Yaqian Zhao, Jiangsu (CN)

(73) Assignee: INSPUR SUZHOU INTELLIGENT TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 17/799,301

(22) PCT Filed: Sep. 28, 2020

(86) PCT No.: PCT/CN2020/118307
§ 371 (c)(1),
(2) Date: Aug. 12, 2022

(87) PCT Pub. No.: WO2021/159717
PCT Pub. Date: Aug. 19, 2021

(65) Prior Publication Data
US 2023/0082100 A1 Mar. 16, 2023

(30) Foreign Application Priority Data
Feb. 14, 2020 (CN) .......................... 202010093456.2

(51) Int. Cl.
*G06T 7/593* (2017.01)
(52) U.S. Cl.
CPC .................................... *G06T 7/593* (2017.01)
(58) Field of Classification Search
CPC .................................................... G06T 7/593
See application file for complete search history.

(56) References Cited

U.S. PATENT DOCUMENTS

2013/0272600 A1 10/2013 Garcia Becerro et al.

FOREIGN PATENT DOCUMENTS

| CN | 102239503 A | * 11/2011 | ............. G01C 11/06 |
| CN | 102523464 A | 6/2012 | |

(Continued)

OTHER PUBLICATIONS

Xiaoguang Chen, Dan Li and Jiancheng Zou, "Depth estimation of stereo matching based on microarray camera," 2017 2nd International Conference on Image, Vision and Computing (ICIVC), Chengdu, China, 2017, pp. 108-112, doi: 10.1109/ICIVC.2017.7984528. (Year: 2017).*

(Continued)

*Primary Examiner* — Charles T Shedrick
(74) *Attorney, Agent, or Firm* — Cooper Legal Group, LLC (57) ABSTRACT

Provided are a content-adaptive binocular matching method and apparatus. The method includes: dividing both left and right images into grids so as to calculate feature information at grid points, and performing matching calculation between the left and right images at the grid points according to the feature information so as to determine points with high matching degrees as reference points; calculating parallax values of the reference points, determining an interlayer spacing, and layering all the reference points in a depth direction according to the parallax values and the interlayer spacing; for a non-reference point pixel in a certain image, determining a reference point closest to the non-reference point pixel, and determining a search range and the parallax value of the reference point; and performing matching calculation on the non-reference point pixel and a pixel in the search range in the other image.

20 Claims, 2 Drawing Sheets

(56) References Cited

FOREIGN PATENT DOCUMENTS

| | | | | | |
|---|---|---|---|---|---|
| CN | 102800083 | A | | 11/2012 | |
| CN | 106355570 | A | | 1/2017 | |
| CN | 107025660 | A | | 8/2017 | |
| CN | 108765414 | A | * | 11/2018 | ........... G06K 9/6247 |
| CN | 109919911 | A | * | 6/2019 | |
| CN | 109961092 | A | | 7/2019 | |
| CN | 110533703 | A | | 12/2019 | |
| CN | 110610476 | A | * | 12/2019 | |
| CN | 111311667 | A | | 6/2020 | |
| CN | 101853508 | A | | 10/2020 | |
| CN | 115222782 | A | * | 10/2022 | ......... G01B 11/2504 |
| DE | 602005002176 | T2 | * | 5/2008 | ............. G06T 5/006 |
| EP | 2111530 | B1 | * | 11/2017 | ............. G01C 11/00 |
| JP | 2015019346 | A | * | 1/2015 | |
| WO | WO-2014024579 | A1 | * | 2/2014 | ............. G01B 11/00 |

OTHER PUBLICATIONS

International Search Report cited in PCT application PCT/CN2020/118307, dated Jan. 4, 2021, 5 pages.

Written Opinion of International Searching Authority of corresponding PCT application PCT/CN2020/118307, dated Jan. 4, 2021, 8 pages.

Notification to Grant Patent Right for Invention of corresponding CN priority application (CN202010093456.2), dated Apr. 13, 2022, 3 pages.

* cited by examiner

CONTENT-ADAPTIVE BINOCULAR MATCHING METHOD AND APPARATUS

This application claims priority to Chinese Patent Application No. 202010093456.2, filed on Feb. 14, 2020, in China National Intellectual Property Administration and entitled "Content-Adaptive Binocular Matching Method and Apparatus", the contents of which are hereby incorporated by reference in its entirety.

FIELD

The present disclosure relates to the field of computers, and more particularly to a content-adaptive binocular matching method and apparatus.

BACKGROUND

Three-dimensional perception is a technology of detecting, reconstructing, and recognizing a real environment using a sensing device, and is a basis of many intelligent technologies such as self driving, virtual/augmented reality, robots, and measurement. Reconstruction of depth information of the real environment is the key and basic content in three-dimensional perception. Depth information reconstruction based on a binocular stereo camera may obtain dense depth information, and meanwhile, images include abundant information capable of providing important data sources for perception. A binocular camera is high in environmental adaptability and low in cost, and thus has particular advantages compared with other depth reconstruction technologies such as structured light and time of flight. As one of the important technologies in the field of three-dimensional perception, it has broad application prospects. The basic principle of binocular stereo vision is observing the same scene from two angles to obtain perceived images at different viewing angles, and further calculating, by use of a trigonometric measurement principle, a positional deviation (parallax) between pixels of the perceived images at different viewing angles, thereby representing three-dimensional information of the selected scene. Binocular matching refers to matching two pictures of the binocular camera to obtain corresponding points in one-to-one correspondence, and then calculating a parallax between the corresponding points. Stereo matching is the hardest link in a stereo vision system, and the matching technology often determines the performance of the whole vision system. How to accurately obtain depth information of a two-dimensional image to create a binocular stereo vision system robust to a variable environment around is still a difficult point in stereo vision research. In practical applications, binocular vision has two major sore points: real-time performance and accuracy. First, extracting three-dimensional information from a binocular image is a complex algorithmic problem easily affected by noises, occlusions, and other non-ideal factors in practical scenarios. In addition, related algorithms of binocular vision are high in computation burden, and the calculation process often cannot meet the requirement for real-time processing. Such problems restrict the application of the binocular vision technology to practical systems.

Binocular stereo matching may be divided as a whole into two types: global algorithm and local algorithm. The global algorithm is an optimization problem, and adds a global smoothness constraint to a parallax in form of a Markov random field-based energy function, thereby improving the parallax solving accuracy. This method is to calculate a minimum value of a global energy function. This problem is a Non-deterministic Polynomial (NP)-hard problem, and is usually solved by some approximation methods, such as an image segmentation method and a belief propagation method. Such a manner is complex in calculation, has a high storage requirement, and usually needs many calculation and storage resources even for low-resolution images. The global algorithm is relatively high in accuracy but large in calculation amount and relatively limited in reached frame rate. The local algorithm is relatively fast, but the accuracy thereof is related to the matching search range. A small search range may cause a relatively high matching failure rate, and a large search range may improve the accuracy to some extent but cause inaccurate matching at the boundary. Limited by hard problems such as weak texture regions and occlusions, this method is usually not so accurate as the global algorithm. An accurate and efficient binocular matching method is an important basis of prompting the application and popularization of a binocular stereo vision technology and a problem urgent to be solved.

SUMMARY

In view of this, an objective of embodiments of the present disclosure is to disclose a content-adaptive binocular matching method, to reduce the computational complexity of a matching process and improve the matching efficiency while ensuring the matching accuracy.

Based on the above objective, one aspect of the embodiments of the present disclosure provides a content-adaptive binocular matching method, including the following steps:

dividing both left and right images into grids so as to calculate feature information at grid points, and performing matching calculation between the left and right images at the grid points according to the feature information so as to determine points with high matching degrees as reference points;

calculating parallax values of the reference points, determining an interlayer spacing, and layering all the reference points in a depth direction according to the parallax values and the interlayer spacing;

for a non-reference point pixel in a certain image, determining a reference point closest to the non-reference point pixel, and determining a search range according to a depth layer where the closest reference point is located and the parallax value of the reference point;

performing matching calculation on the non-reference point pixel and a pixel in the search range in the other image.

In some implementation modes, the dividing both left and right images into grids so as to calculate feature information at grid points and performing matching calculation between the left and right images at the grid points according to the feature information so as to determine points with high matching degrees as reference points includes:

performing matching calculation between the left and right images according to the feature information, determining points with high matching degrees as matched pixels first, and then performing left-right consistency check on all the matched pixels so as to delete the matched pixels that do not satisfy a left-right consistency condition.

In some implementation modes, the dividing both left and right images into grids so as to calculate feature information at grid points and performing matching calculation between the left and right images at the grid points according to the feature information so as to determine points with high matching degrees as reference points further includes:

performing matching accuracy check and regional similarity check on the matched pixels subjected to left-right consistency check so as to implement screening of the matched pixels, and determining screened matched pixels as reference points.

In some implementation modes, the calculating parallax values of the reference points, determining an interlayer spacing, and layering all the reference points in a depth direction according to the parallax values and the interlayer spacing includes:

determining a minimum reference parallax and a maximum reference parallax, and performing layering within a range of the minimum reference parallax and the maximum reference parallax in the depth direction according to the interlayer spacing.

In some implementation modes, the calculating parallax values of the reference points, determining an interlayer spacing, and layering all the reference points in a depth direction according to the parallax values and the interlayer spacing further includes:

establishing a reference point lookup table, wherein the lookup table stores a depth layer where each reference point is located and the parallax value of each reference point.

In some implementation modes, the for a non-reference point pixel in a certain image, determining a reference point closest to the non-reference point pixel, and determining a search range according to a depth layer where the closest reference point is located and the parallax value of the reference point includes:

obtaining a position of the non-reference point pixel in the grids according to coordinate information of the reference point pixel in the image so as to obtain reference pixels around the non-reference point pixel and determine the reference point closest to the non-reference point pixel.

In some implementation modes, the for a non-reference point pixel in a certain image, determining a reference point closest to the non-reference point pixel, and determining a search range according to a depth layer where the closest reference point is located and the parallax value of the reference point further includes:

obtaining the depth layer where the closest reference point is located according to the lookup table, determining a corresponding overflow item according to the depth layer, and adding the overflow item to the parallax value of the closest reference point as a parallax search range for matching calculation of the non-reference point pixel.

In some implementation modes, the for a non-reference point pixel in a certain image, determining a reference point closest to the non-reference point pixel, and determining a search range according to a depth layer where the closest reference point is located and the parallax value of the reference point further includes:

the smaller the depth layer is, the larger the value of the overflow item is, and the larger the depth layer is, the smaller the value of the overflow item is.

In some implementation modes, the performing matching calculation on the non-reference point pixel and a pixel in the search range in the other image includes:

within the parallax search range, calculating matching costs between all pixels to be matched in the search range in the other image and the non-reference point pixel, determining the pixel to be matched corresponding to the minimum cost as a matched point of the non-reference point pixel, and calculating a parallax value between the non-reference point pixel and the matched point.

Another aspect of the embodiments of the present disclosure provides a content-adaptive binocular matching apparatus, including:

at least one processor; and a memory, having a program code executable by the processor stored thereon, which when executed, implements any of the above-mentioned methods.

The present disclosure has the following beneficial technical effects. According to the content-adaptive binocular matching method and apparatus provided in the embodiments of the present disclosure, a stepwise matching process is designed, and reference points with high matching accuracy are taken as references, whereby the matching accuracy is ensured, and meanwhile, the overall computational complexity is reduced. A depth-direction layering-based matching method is designed, and different parallax search ranges may be used according to different depth layers, whereby the efficiency of a matching search process is improved. A depth lookup table is designed to establish correlations between reference points and points to be matched and determine accurate parallax values of the reference points as parallax search range for reference in subsequent matching, whereby the matching inefficiency in the matching search process is reduced. A depth-dependent search overflow item is designed, whereby the matching accuracy is ensured, and meanwhile, a specific parallax search range is determined according to characteristics of a scenario, improving the calculation efficiency.

BRIEF DESCRIPTION OF THE DRAWINGS

In order to more clearly illustrate the technical solutions in the embodiments of the present application or the prior art, the drawings needing to be used in the description of the embodiments or the prior art will be briefly introduced below. It is obvious that the drawings in the following description are merely some embodiments of the present application, and a person of ordinary skill in the art may also obtain other embodiments according to these drawings without involving any inventive effort.

DETAILED DESCRIPTION

The embodiments of the present disclosure are described below. However, it is to be understood that the disclosed embodiments are merely examples, and various alternative forms may be used for other embodiments. The drawings are not necessarily drawn to scale, and some functions may be exaggerated or minimized so as to present details of specific components. Therefore, specific structures and function details disclosed herein should not be explained as limitations but are only representative bases for enlightening those skilled in the art to use the present disclosure in various manners. It is to be understood by those ordinarily skilled in the art that various features shown and described with reference to any drawing may be combined with one or more features shown in the other drawings so as to form embodiments that are not shown or described clearly. The combinations of the shown features provide representative embodiments for typical application. However, various combinations and modifications of the features consistent with the enlightenment of the present disclosure may be desired for some specific applications or implementation modes.

In order to make the objective, technical solutions, and advantages of the present disclosure clearer, the embodiments of the present disclosure will further be described below in detail in combination with specific embodiments and with reference to the drawings.

Figure 1:
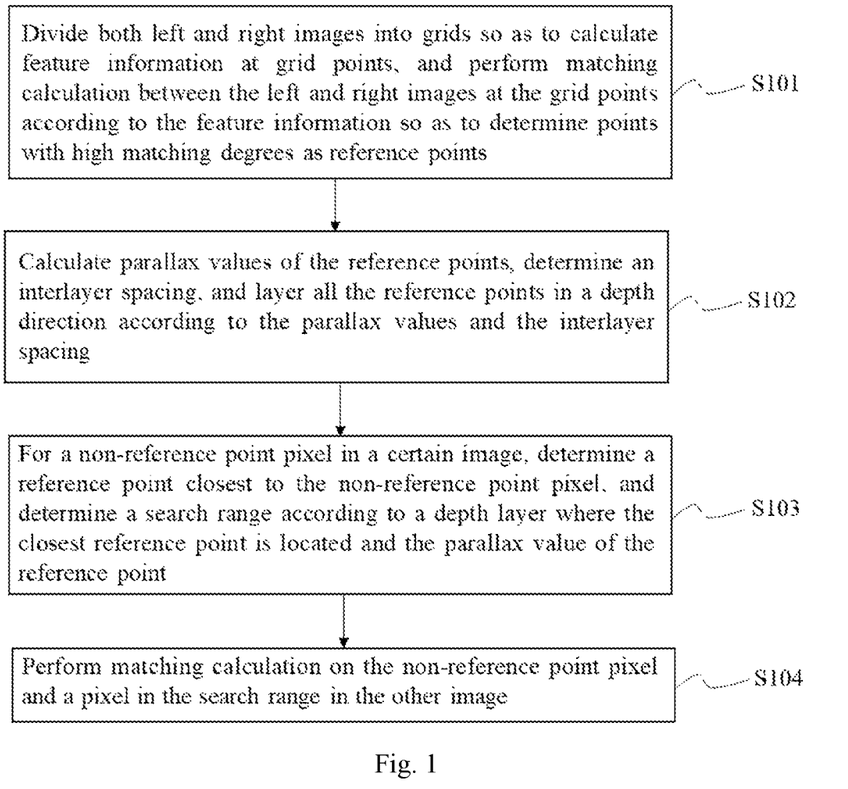
FIG. 1 is a flowchart of a content-adaptive binocular matching method according to the present disclosure.

Based on the above objective, one aspect of the embodiments of the present disclosure provides a content-adaptive binocular matching method, which, as shown in FIG. 1, includes the following steps.

Step S101: divide both left and right images into grids so as to calculate feature information at grid points, and perform matching calculation between the left and right images at the grid points according to the feature information so as to determine points with high matching degrees as reference points.

Step S102: calculate parallax values of the reference points, determine an interlayer spacing, and layer all the reference points in a depth direction according to the parallax values and the interlayer spacing.

Step S103: for a non-reference point pixel in a certain image, determine a reference point closest to the non-reference point pixel, and determine a search range according to a depth layer where the closest reference point is located and the parallax value of the reference point.

Step S104: perform matching calculation on the non-reference point pixel and a pixel in the search range in the other image.

In some embodiments, reference matched points with high confidence are calculated first. In this step, matching calculation is performed on positions with obvious features in the images so as to obtain a part of matched points with relatively high confidences as reference points, and parallax values corresponding to these reference points are calculated.

In some embodiments, the step that both left and right images are divided into grids so as to calculate feature information at grid points and matching calculation between the left and right images is performed at the grid points according to the feature information so as to determine points with high matching degrees as reference points includes: performing matching calculation between the left and right images according to the feature information, determining points with high matching degrees as matched pixels first, and then performing left-right consistency check on all the matched pixels so as to delete the matched pixels that do not satisfy a left-right consistency condition.

In an embodiment according to the present disclosure, the image is divided into grids according to a step lengths, and all grid points form a sparse sample of the original image. s may be determined comprehensively according to the accuracy, the computational complexity, and other factors. Feature information at all sample points is calculated. Here, the feature information may be a feature obtained by various filtering algorithms, or a value calculated by other methods to represent personalized information of each sample point. Matching calculation between the left and right images is performed according to the calculated feature information at each sample point so as to determine points with the highest matching degree as matched pixels. The matching search range may be determined comprehensively according to the accuracy, the computational complexity, and other factors, and is usually required to be larger than half of the image width. The matching degree may be represented by a matching cost that may be obtained by accumulating absolute values of pixel differences or by other cost calculation methods.

In some embodiments, the step that both left and right images are divided into grids so as to calculate feature information at grid points and matching calculation is performed between the left and right images at the grid points according to the feature information so as to determine points with high matching degrees as reference points further includes: performing matching accuracy check and regional similarity check on the matched pixels subjected to left-right consistency check so as to implement screening of the matched pixels, and determining screened matched pixels as reference points.

In an embodiment according to the present disclosure, left-right consistency check is performed on all the calculated matched pixels. Consistency check is performed on the matched pixels obtained by taking the left image as a reference image and the right image as a target image and the matched pixels obtained by taking the right image as a reference image and the left image as a target image. Only points that are determined to be matched in both matching modes are regarded as satisfying the left-right consistency condition. The matched pixels that do not satisfy the left-right consistency condition are deleted from the calculated matched pixels.

Then, matching accuracy check is further performed on a result obtained by consistency check. When a ratio of a matching cost corresponding to the best matched point to that of the second best matched point is less than a certain threshold $\alpha$, it is determined that the best matched point meets an accuracy requirement. $\alpha$ is a value between 0 and 1. When the value of $\alpha$ is smaller, the accuracy of the selected best matched point is higher.

Regional similarity check is further performed on a result obtained by matching accuracy check. A relationship between each matched pixel and pixels around is checked. When the relationship between the matched pixel and the pixels around is consistent in the reference image and the target image, it is determined that the matched pixel satisfies a regional similarity condition. Finally, all screened matched pixels are determined as reference points.

In some embodiments, all the reference points are layered in a depth direction. Parallax values of all the reference points may be calculated. In binocular stereo vision, a greater parallax corresponds to a smaller depth value, and the reverse is also true. Layering all the reference points according to parallaxes corresponds to layering according to depths.

In some embodiments, the step that parallax values of the reference points are calculated, an interlayer spacing is determined, and all the reference points are layered in a depth direction according to the parallax values and the interlayer spacing includes: determining a minimum reference parallax and a maximum reference parallax, and performing layering within a range of the minimum reference parallax and the maximum reference parallax in the depth direction according to the interlayer spacing.

In some embodiments, the step that parallax values of the reference points are calculated, an interlayer spacing is determined, and all the reference points are layered in a depth direction according to the parallax values and the interlayer spacing further includes: establishing a reference point lookup table, wherein the lookup table stores a depth layer where each reference point is located and the parallax value of each reference point.

In an embodiment according to the present disclosure, a minimum reference parallax and a maximum reference parallax are determined. Taking the selection of the minimum reference parallax as an example, a minimum value in all reference point parallaxes may be selected as a reference parallax, or any value less than a minimum reference point parallax may be determined as the reference parallax. The interlayer spacing is determined. The interlayer spacing refers to a parallax difference between adjacent layers, and may affect the subsequent matching accuracy and computational complexity. The interlayer spacing may be determined according to an actual situation. A reference point lookup table is established. The reference point lookup table may be organized according to the form of the divided grid. The lookup table stores a depth layer where each reference point is located and the parallax value of each reference point. For all pixels in the original image, grid cells where the pixels are located may be calculated according to a grid division step length to further obtain reference points around the pixels.

In some embodiments, the step that for a non-reference point pixel in a certain image, a reference point closest to the non-reference point pixel is determined and a search range is determined according to a depth layer where the closest reference point is located and the parallax value of the reference point includes: obtaining a position of the non-reference point pixel in the grids according to coordinate information of the reference point pixel in the image so as to obtain reference pixels around the non-reference point pixel and determine the reference point closest to the non-reference point pixel.

In some embodiments, the step that for a non-reference point pixel in a certain image, a reference point closest to the non-reference point pixel is determined and a search range is determined according to a depth layer where the closest reference point is located and the parallax value of the reference point further includes that: the depth layer where the closest reference point is located is obtained according to the lookup table, a corresponding overflow item is determined according to the depth layer, and the overflow item is added to the parallax value of the closest reference point as a parallax search range for matching calculation of the non-reference point pixel.

In some embodiments, the step that for a non-reference point pixel in a certain image, a reference point closest to the non-reference point pixel is determined and a search range is determined according to a depth layer where the closest reference point is located and the parallax value of the reference point further includes: the smaller the depth layer is, the larger the value of the overflow item is, and the larger the depth layer is, the smaller the value of the overflow item is.

Figure 2:
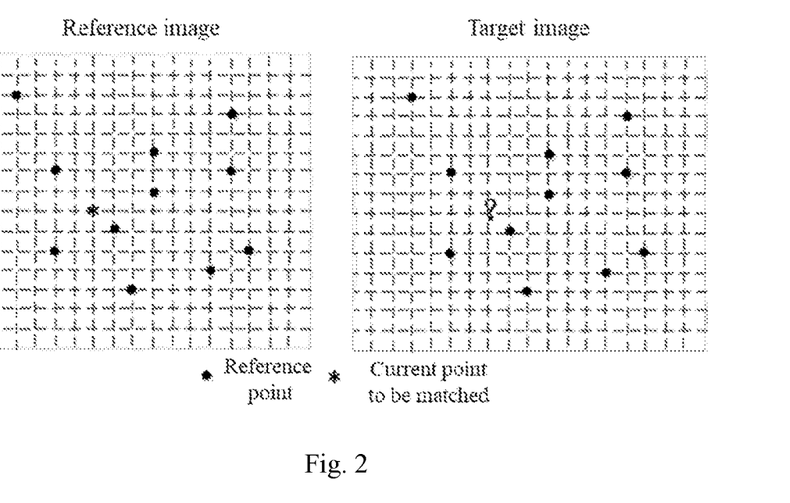
FIG. 2 is a schematic diagram of reference-point-based matching according to the present disclosure.

In an embodiment according to the present disclosure, adaptive matching calculation is performed on all non-reference point pixels. In this step, the calculated parallax values of the reference points and the corresponding lookup table are used as the basis. As shown in FIG. 2, matched points of all the non-reference point pixels are calculated, and parallaxes between the corresponding matched points are calculated. The following operations are mainly included.

For a certain non-reference point pixel, reference points around the non-reference point pixel are determined. A position of this pixel in the grids may be obtained according to coordinate information of this pixel in the image, and the reference points around the pixel may further be obtained. The reference points around are selected within a certain range. Closest reference points at the top, bottom, left, and right of the pixel may be selected. Alternatively, other selection solutions may be determined as needed.

The depth layer where the current pixel to be matched is located is calculated. By the above calculation, the reference points around the current pixel are obtained, and the depth layer where the closest reference point is located is selected as the depth layer where the current pixel is located. An adaptive parallax search range for matching calculation of the current pixel is determined. The parallax search range is determined according to the reference point and depth layer corresponding to the current pixel. An overall item β is added to the parallax value of the corresponding reference point as the parallax search range for matching calculation of the current pixel. β is determined in combination with the depth layer where the current pixel is located. Generally, the smaller the depth layer is, the larger the value of the overflow item is, and the larger the depth layer is, the smaller the value of the overflow item is. The existence of the overall item reflects the adaptability of the matching process to specific information of the scenario. The parallax search range for pixel matching calculation may be determined according to characteristics of the scenario.

In some embodiments, the step that matching calculation is performed on the non-reference point pixel and a pixel in the search range in the other image includes: within the parallax search range, calculating matching costs between all pixels to be matched in the search range in the other image and the non-reference point pixel, determining the pixel to be matched corresponding to the minimum cost as a matched point of the non-reference point pixel, and calculating a parallax value between the non-reference point pixel and the matched point.

The technical features listed above for different embodiments may be combined, varied, added, omitted, etc., if technically possible, thereby forming other embodiments within the scope of the present disclosure.

It can be seen from the above-mentioned embodiment that, according to the content-adaptive binocular matching method provided in the embodiment of the present disclosure, the matching accuracy is ensured, meanwhile, the computational complexity of the matching process is reduced, and the matching efficiency is improved. Reference points with high confidences are obtained by high-accuracy matching calculation as references in subsequent matching. The reference points are layered in a depth direction, and different matching measures are used for pixels in different depth layers in a scenario, thereby implementing content-adaptive matching calculation of the scenario. A reference point lookup table is established to establish correlations between reference points and points to be matched, and search ranges may be determined in subsequent pixel matching processes according to parallaxes of the reference points. A parallax search overflow item is set, whereby the computational complexity of the matching process is reduced. A search range of a pixel to be matched is extended by the overflow item on the basis of taking the reference point parallax as a minimum search range, whereby the matching accuracy is ensured.

Based on the above objective, another aspect of the embodiments of the present disclosure discloses an embodiment of a content-adaptive binocular matching apparatus.

The content-adaptive binocular matching apparatus includes a memory and at least one processor. The memory stores a computer program capable of running in the processor. The processor executes the program to execute any above-mentioned method.

Figure 3:
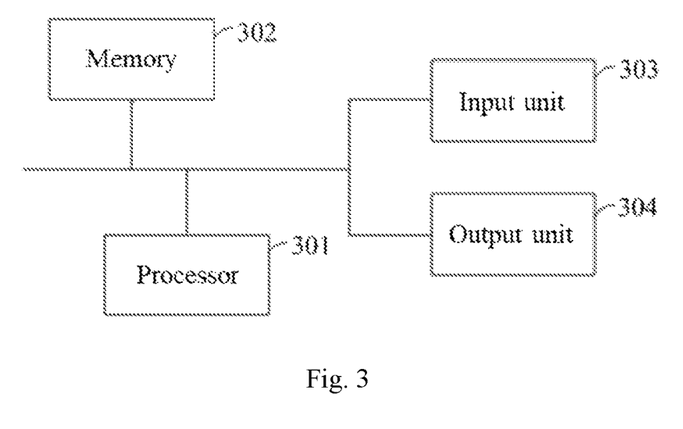
FIG. 3 is a schematic diagram of a hardware structure of a content-adaptive binocular matching apparatus according to the present disclosure.

FIG. 3 is a schematic diagram of a hardware structure of an embodiment of a content-adaptive binocular matching apparatus according to the present disclosure.

Taking a computer device shown in FIG. 3 as an example, the computer device includes a processor 301 and a memory 302, and may further include an input unit 303 and an output unit 304.

The processor 301, the memory 302, the input unit 303, and the output unit 304 may be connected by a bus or other manners. FIG. 3 takes connection by a bus as an example.

As a nonvolatile computer-readable storage medium, the memory 302 may be configured to store a nonvolatile software program, a nonvolatile computer-executable program, and a module, such as a program instruction/module corresponding to the content-adaptive binocular matching method as described in the embodiments of the present application. The processor 301 runs the nonvolatile software program, instruction, and module stored in the memory 302, thereby executing various types of function applications and data processing of a server, namely implementing the content-adaptive binocular matching method in the method embodiment.

The memory 302 may include a program storage region and a data storage region. The program storage region may store an operating system and an application program needed by at least one function. The data storage region may store data created according to the content-adaptive binocular matching method, etc. In addition, the memory 302 may include a high-speed Random Access Memory (RAM), and may also include a nonvolatile memory, such as at least one disc memory device, flash memory device, or another nonvolatile solid-state memory device. In some embodiments, the memory 302 optionally includes a memory arranged remotely relative to the processor 301, and the remote memory may be connected to a local module through a network. Examples of the network include, but not limited to, the Internet, an intranet of an enterprise, a local area network, a mobile communication network, and a combination thereof.

The input unit 303 may receive input numeral or character information and generate key signal inputs related to user settings and function control of the computer device executing the content-adaptive binocular matching method. The output unit 304 may include a display device such as a display screen.

The one or more program instructions/modules corresponding to the content-adaptive binocular matching method are stored in the memory 302 and executed by the processor 301 to execute the content-adaptive binocular matching method in any method embodiment.

In any embodiment of the computer device executing the content-adaptive binocular matching method, effects the same as or similar to those in any corresponding method embodiment may be achieved.

It should be noted that those skilled in the art will appreciate that all or part of the processes in the methods of the above-mentioned embodiments can be completed by instructing relevant hardware through computer-readable instructions or a program, and the computer-readable instructions or program may be stored in a computer-readable storage medium which, when executed, may cause a processor to perform the processes of the embodiments of the methods described above. The storage medium may be a magnetic disk, an optical disk, a Read-Only Memory (ROM), a Random Access Memory (RAM), etc.

In addition, typically, the apparatus, device, etc., disclosed in the embodiments of the present disclosure may be various electronic terminal devices such as a mobile phone, a Personal Digital Assistant (PDA), a PAD, and a smart television, or may be a large terminal device such as a server. Therefore, the scope of protection disclosed in the embodiments of the present disclosure should not be limited to apparatuses and devices of a specific type. The client disclosed in the embodiments of the present disclosure may be applied to any above-mentioned electronic terminal device in form of electronic hardware, computer software, or a combination thereof.

In addition, the method disclosed according to the embodiments of the present disclosure may also be implemented as a computer program executed by a Central Processing Unit (CPU). The computer program may be stored in a computer-readable storage medium. When the computer program is executed by the CPU, the functions defined in the method disclosed in the embodiments of the present disclosure are executed.

Moreover, each method step and system unit may also be implemented by a controller and a computer-readable storage medium configured to store a computer program enabling the controller to implement the steps or functions of the units.

Furthermore, it is to be understood that the computer-readable storage medium (such as a memory) herein may be a volatile memory or a nonvolatile memory, or may include both a volatile memory and a nonvolatile memory. As an example rather than a restriction, the nonvolatile memory may include a ROM, a Programmable ROM (PROM), an Electrically PROM (EPROM), an Electrically EPROM (EEPROM), or a flash memory. The volatile memory may include a RAM that may be used as an external cache memory. As an example rather than a restriction, the RAM may be obtained in various forms, such as a Synchronous RAM (SRAM), a Dynamic RAM (DRAM), a Synchronous DRAM (SDRAM), a Double Data Rate SDRAM (DDR SDRAM), an Enhanced SDRAM (ESDRAM), a Synchronous Link DRAM (SLDRAM), and a Direct Rambus RAM (DRRAM). The memory device in the disclosed aspect is intended to include, but not limited to, these or other proper types of memories.

It is also understood by those skilled in the art that various exemplary logic blocks, modules, circuits, and algorithm steps described in combination with the present disclosure herein may be implemented as electronic hardware, computer software, or a combination thereof. For ease of description about such interchangeability of hardware and software, functions of various schematic components, blocks, modules, circuits, and steps are described generally. Whether these functions are implemented as software or hardware depends on specific applications and design constraints on the whole system. Those skilled in the art may realize the functions for each specific application in various manners, but such realization should not be explained as resulting in departure from the scope disclosed in the embodiment of the present disclosure.

Various exemplary logic blocks, modules, and circuits described in combination with the disclosure herein may be implemented or executed by the following components designed to execute the functions herein: a general-purpose processor, a Digital Signal Processor (DSP), an Application Specific Integrated Circuit (ASIC), a Field-Programmable Gate Array (FPGA) or another programmable logic device, a discrete gate or transistor logic, a discrete hardware component, or any combination thereof. The general-purpose processor may be a microprocessor. However, the processor may alternatively be any conventional processor, controller, microcontroller, or state machine. Alternatively, the processor may be implemented as a combination of computing devices, such as a combination of a DSP and a microprocessor, multiple microprocessors, a combination of one or more microprocessors and a DSP, and/or any other such configuration.

The steps of the method or algorithm described in combination with the disclosure herein may be directly included in hardware, a software module executed by the processor, or a combination thereof. The software module may be located in a RAM, a flash memory, a ROM, an EPROM, an EEPROM, a register, a hard disk, a removable disk, a Compact Disc ROM (CD-ROM), or a storage medium of any other form well known in this art. The storage medium is exemplarily coupled to the processor such that the processor may read information from the storage medium or write information to the storage medium. In an alternative solution, the storage medium may be integrated with the processor. The processor and the storage medium may be located in an ASIC. The ASIC may be located in a user terminal. In an alternative solution, the processor and the storage medium may be located in a user terminal as discrete components.

In one or more exemplary designs, the function may be realized in hardware, software, firmware, or any combination thereof. If being realized in software, the function may be stored in a computer-readable medium or transmitted through the computer-readable medium as one or more instructions or codes. The computer-readable medium includes a computer storage medium and a communication medium. The communication medium includes any medium that helps to transmit a computer program from one position to another. The storage medium may be any available medium accessible for a general-purpose or special-purpose computer. As an example rather than a restriction, the computer-readable medium may include a RAM, a ROM, an EEPROM, a CD-ROM or another optical disc memory device, a disk memory device or another magnetic memory device, or any other medium available for carrying or storing a needed program code in form of an instruction or a data structure and accessible for a general-purpose or special-purpose computer or a general-purpose or special-purpose processor. In addition, any connection may be referred to as a computer-readable medium as appropriate. For example, if a coaxial cable, a fiber optic cable, a twisted pair, a Digital Subscriber Line (DSL), or a wireless technology like infrared, radio, and microwave is used to send software from a website, a server, or another remote source, the coaxial cable, the fiber optic cable, the twisted pair, the DSL, or the wireless technology like infrared, radio, and microwave is included in the definition of the medium. As used herein, the magnetic disk and the optical disc include a Compact Disc (CD), a laser disc, an optical disc, a Digital Versatile Disc (DVD), a floppy disc, and a blue-ray disc. Generally, the magnetic disk magnetically reproduces data, while the optical disc optically reproduces data using laser. Combinations of the above-mentioned contents should also be included in the scope of the computer-readable medium.

It is to be understood that, as used herein, the singular form "a/an" is intended to include the plural form also, unless exceptional cases are supported clearly in the context. It is also to be understood that "and/or" used herein refers to including any or all possible combinations of one or more than one item that is listed associatively.

The sequence numbers of the embodiments of the present disclosure are only for description and do not represent superiority-inferiority of the embodiments.

It can be understood by those ordinarily skilled in the art that all or part of the steps of the above-mentioned embodiments may be completed by hardware, or by a program by instructing related hardware. The program may be stored in a computer-readable storage medium. The above-mentioned storage medium may be a ROM, a magnetic disk, an optical disk, or the like.

The above-mentioned embodiment is a possible example of implementation mode only for understanding the principle of the present disclosure clearly. It is to be understood by those ordinarily skilled in the art that discussions about any above embodiment are only exemplary and not intended to imply that the scope (including the claims) disclosed in the embodiments of the present disclosure is limited to these examples. Under the concept of the embodiments of the present disclosure, the above embodiments or technical features in different embodiments may also be combined, and there are many other variations of different aspects of the embodiments of the present disclosure as described above, which are not provided in details for brevity. Therefore, any omissions, modifications, equivalent replacements, improvements, etc., made within the spirit and principle of the embodiments of the present disclosure shall fall within the scope of protection of the embodiments of the present disclosure.

What is claimed is:

1. A content-adaptive binocular matching method, comprising:
    dividing both left and right images into grids so as to calculate feature information at grid points, and performing matching calculation between the left and right images at the grid points according to the feature information so as to determine points with high matching degrees as reference points;
    calculating parallax values of the reference points, determining an interlayer spacing, and layering all the reference points in a depth direction according to the parallax values and the interlayer spacing;
    for a non-reference point pixel in a certain image, determining a reference point closest to the non-reference point pixel, and determining a search range according to a depth layer where the closest reference point is located and the parallax value of the reference point;
    performing matching calculation on the non-reference point pixel and a pixel in the search range in the other image.

2. The method according to claim 1, wherein the dividing both left and right images into grids so as to calculate feature information at grid points and performing matching calculation between the left and right images at the grid points according to the feature information so as to determine points with high matching degrees as reference points comprises:
    performing matching calculation between the left and right images according to the feature information, determining points with high matching degrees as matched pixels first, and then performing left-right consistency check on all the matched pixels so as to delete the matched pixels that do not satisfy a left-right consistency condition.

3. The method according to claim 2, wherein the dividing both left and right images into grids so as to calculate feature information at grid points and performing matching calculation between the left and right images at the grid points according to the feature information so as to determine points with high matching degrees as reference points further comprises:
    performing matching accuracy check and regional similarity check on the matched pixels subjected to the left-right consistency check so as to implement screening of the matched pixels, and determining screened matched pixels as the reference points.

4. The method according to claim 1, wherein the calculating parallax values of the reference points, determining an interlayer spacing, and layering all the reference points in a depth direction according to the parallax values and the interlayer spacing comprises:

determining a minimum reference parallax and a maximum reference parallax, and performing layering within a range of the minimum reference parallax and the maximum reference parallax in the depth direction according to the interlayer spacing.

5. The method according to claim 4, wherein the calculating parallax values of the reference points, determining an interlayer spacing, and layering all the reference points in a depth direction according to the parallax values and the interlayer spacing further comprises:

establishing a reference point lookup table, wherein the reference point lookup table stores a depth layer where each reference point is located and the parallax value of each reference point.

6. The method according to claim 5, wherein the for a non-reference point pixel in a certain image, determining a reference point closest to the non-reference point pixel, and determining a search range according to a depth layer where the closest reference point is located and the parallax value of the reference point comprises:

obtaining a position of the non-reference point pixel in the grids according to coordinate information of the reference point pixel in the certain image so as to obtain reference pixels around the non-reference point pixel and determine the reference point closest to the non-reference point pixel.

7. The method according to claim 6, wherein the for a non-reference point pixel in a certain image, determining a reference point closest to the non-reference point pixel, and determining a search range according to a depth layer where the closest reference point is located and the parallax value of the reference point further comprises:

obtaining the depth layer where the closest reference point is located according to the reference point lookup table, determining a corresponding overflow item according to the depth layer, and adding the overflow item to the parallax value of the closest reference point as a parallax search range for matching calculation of the non-reference point pixel.

8. The method according to claim 7, wherein the for a non-reference point pixel in a certain image, determining a reference point closest to the non-reference point pixel, and determining a search range according to a depth layer where the closest reference point is located and the parallax value of the reference point further comprises:

the smaller the depth layer is, the larger a value of the overflow item is, and the larger the depth layer is, the smaller the value of the overflow item is.

9. The method according to claim 1, wherein the performing matching calculation on the non-reference point pixel and a pixel in the search range in the other image comprises:

within the search range, calculating matching costs between all pixels to be matched in the search range in the other image and the non-reference point pixel, determining the pixel to be matched corresponding to a minimum cost as a matched point of the non-reference point pixel, and calculating a parallax value between the non-reference point pixel and the matched point.

10. A content-adaptive binocular matching apparatus, comprising:

at least one processor; and
a memory, having a program code executable by the processor stored thereon, which when executed, implements a content-adaptive binocular matching method, wherein the method comprises:

dividing both left and right images into grids so as to calculate feature information at grid points, and performing matching calculation between the left and right images at the grid points according to the feature information so as to determine points with high matching degrees as reference points;

calculating parallax values of the reference points, determining an interlayer spacing, and layering all the reference points in a depth direction according to the parallax values and the interlayer spacing;

for a non-reference point pixel in a certain image, determining a reference point closest to the non-reference point pixel, and determining a search range according to a depth layer where the closest reference point is located and the parallax value of the reference point;

performing matching calculation on the non-reference point pixel and a pixel in the search range in the other image.

11. The method according to claim 2, wherein the points with the highest matching degree are determined as matched pixels.

12. The apparatus according to claim 10, wherein the dividing both left and right images into grids so as to calculate feature information at grid points and performing matching calculation between the left and right images at the grid points according to the feature information so as to determine points with high matching degrees as reference points comprises:

performing matching calculation between the left and right images according to the feature information, determining points with high matching degrees as matched pixels first, and then performing left-right consistency check on all the matched pixels so as to delete the matched pixels that do not satisfy a left-right consistency condition.

13. The apparatus according to claim 12, wherein the dividing both left and right images into grids so as to calculate feature information at grid points and performing matching calculation between the left and right images at the grid points according to the feature information so as to determine points with high matching degrees as reference points further comprises:

performing matching accuracy check and regional similarity check on the matched pixels subjected to the left-right consistency check so as to implement screening of the matched pixels, and determining screened matched pixels as the reference points.

14. The apparatus according to claim 10, wherein the calculating parallax values of the reference points, determining an interlayer spacing, and layering all the reference points in a depth direction according to the parallax values and the interlayer spacing comprises:

determining a minimum reference parallax and a maximum reference parallax, and performing layering within a range of the minimum reference parallax and the maximum reference parallax in the depth direction according to the interlayer spacing.

15. The apparatus according to claim 14, wherein the calculating parallax values of the reference points, determining an interlayer spacing, and layering all the reference points in a depth direction according to the parallax values and the interlayer spacing further comprises:

establishing a reference point lookup table, wherein the reference point lookup table stores a depth layer where each reference point is located and the parallax value of each reference point.

16. The apparatus according to claim 15, wherein the for a non-reference point pixel in a certain image, determining a reference point closest to the non-reference point pixel, and determining a search range according to a depth layer where the closest reference point is located and the parallax value of the reference point comprises:
obtaining a position of the non-reference point pixel in the grids according to coordinate information of the reference point pixel in the certain image so as to obtain reference pixels around the non-reference point pixel and determine the reference point closest to the non-reference point pixel.

17. The apparatus according to claim 16, wherein the for a non-reference point pixel in a certain image, determining a reference point closest to the non-reference point pixel, and determining a search range according to a depth layer where the closest reference point is located and the parallax value of the reference point further comprises:
obtaining the depth layer where the closest reference point is located according to the reference point lookup table, determining a corresponding overflow item according to the depth layer, and adding the overflow item to the parallax value of the closest reference point as a parallax search range for matching calculation of the non-reference point pixel.

18. The apparatus according to claim 17, wherein the for a non-reference point pixel in a certain image, determining a reference point closest to the non-reference point pixel, and determining a search range according to a depth layer where the closest reference point is located and the parallax value of the reference point further comprises:
determining that a value of the overflow item is larger when the depth layer is smaller and the value of the overflow item is smaller when the depth layer is larger.

19. The apparatus according to claim 10, wherein the performing matching calculation on the non-reference point pixel and a pixel in the search range in the other image comprises:
within the search range, calculating matching costs between all pixels to be matched in the search range in the other image and the non-reference point pixel, determining the pixel to be matched corresponding to a minimum cost as a matched point of the non-reference point pixel, and calculating a parallax value between the non-reference point pixel and the matched point.

20. The apparatus according to claim 10, wherein the points with the highest matching degree are determined as matched pixels.

* * * * *